(12) United States Patent
Yang et al.

(10) Patent No.: US 10,559,851 B2
(45) Date of Patent: Feb. 11, 2020

(54) MAGNESIUM BATTERY ELECTROLYTE

(75) Inventors: Jun Yang, Shanghai (CN); Yongsheng Guo, Shanghai (CN); Fan Zhang, Shanghai (CN); Feifei Wang, Shanghai (CN)

(73) Assignees: TOYOTA JIDOSHA KABUSHIKI KAISHA, Toyota (JP); SHANGHAI JIAO TONG UNIVERSITY, Shanghai (CN)

( * ) Notice: Subject to any disclaimer, the term of this patent is extended or adjusted under 35 U.S.C. 154(b) by 1232 days.

(21) Appl. No.: 14/232,732

(22) PCT Filed: Jul. 30, 2012

(86) PCT No.: PCT/CN2012/079376
§ 371 (c)(1),
(2), (4) Date: Jan. 14, 2014

(87) PCT Pub. No.: WO2013/020463
PCT Pub. Date: Feb. 14, 2013

(65) Prior Publication Data
US 2014/0147754 A1    May 29, 2014

(30) Foreign Application Priority Data
Aug. 5, 2011  (CN) .......................... 2011 1 0254585

(51) Int. Cl.
*H01M 10/0568* (2010.01)
*H01M 10/054* (2010.01)
*H01M 10/0569* (2010.01)

(52) U.S. Cl.
CPC ..... *H01M 10/0568* (2013.01); *H01M 10/054* (2013.01); *H01M 10/0569* (2013.01); *H01M 2300/0037* (2013.01)

(58) Field of Classification Search
CPC ........... H01M 10/054; H01M 10/0568; H01M 10/0569; H01M 2300/0037
(Continued)

(56) References Cited

U.S. PATENT DOCUMENTS

2009/0286157 A1 * 11/2009 Chen et al. ................... 429/209
2011/0111286 A1 *  5/2011 Yamamoto et al. .......... 429/188
(Continued)

OTHER PUBLICATIONS

Liebenow (The Electrodeposition of Magnesium Using Solutions of Organomagnesium Halides, Amidomagnesium Halides and Magnesium Organoborates, Electrochemistry Communications, vol. 2, Issue 9, Sep. 2000, pp. 641-645).*

(Continued)

*Primary Examiner* — Cynthia H Kelly
*Assistant Examiner* — Rashid A Alam
(74) *Attorney, Agent, or Firm* — Oliff PLC

(57) ABSTRACT

A magnesium battery electrolyte with a wide electrochemical window was developed. The electrolyte includes an organic boron magnesium salt and an aprotic polar solvent. The organic boron magnesium salt is an organic boron magnesium salt complex formed by compounding a Lewis acid with a boron center and a magnesium-containing Lewis base $R'_{2-n}MgX_n$, wherein n is 0 or 1, R and R' respectively represent a fluoroaryl group, an alkylated aryl group, an aryl group, an alkyl group, or a pyrrolidinyl group, and X represents a halogen. The solvent is an aprotic polar solvent such as ether or a mixed solvent thereof. The concentration of the electrolyte is 0.25 to 1 mol/L, and the electric conductivity is 0.5 to 10 mS/cm. The electrolyte allows reversible deposition/dissolution of magnesium, features good cycling stability, and has a wide electrochemical window (>3.0V vs. $Mg/Mg^{2+}$).

4 Claims, 3 Drawing Sheets

(58) Field of Classification Search
USPC .......................................................... 429/326
See application file for complete search history.

(56) References Cited

U.S. PATENT DOCUMENTS

| | | | | |
|---|---|---|---|---|
| 2011/0159381 A1* | 6/2011 | Doe | ................ | H01M 4/13 |
| | | | | 429/337 |
| 2013/0034780 A1* | 2/2013 | Muldoon | .............. | H01M 4/661 |
| | | | | 429/339 |
| 2013/0065115 A1* | 3/2013 | Kaye | ................ | H01M 4/36 |
| | | | | 429/201 |

OTHER PUBLICATIONS

Aurbach (Electrolyte Solutions for Rechargeable Magnesium Batteries Based on Organomagnesium Chloroaluminate Complexes, Journal of the Electrochemical Society, 149 (2) A 115-A 121 (2002)).*

Erker, (Tris(pentafluorophenyl)borane: a special boron Lewis acid for special reactions, Organisch-Cheisches Institut der Universitat Munster, Mar. 11, 2005, Munster, Germany (Year: 2005).*

Aurbach et al., "Electrolyte Solutions for Rechargeable Magnesium Batteries Based on Organomagnesium Chloroaluminate Complexes," *Journal of the Electrochemical Society*, 2002, pp. A115-A121, vol. 149, No. 2, The Electrochemical Society, Inc.

* cited by examiner

MAGNESIUM BATTERY ELECTROLYTE

FIELD OF THE INVENTION

The present invention relates to a magnesium battery electrolytic solution, and more particularly to a magnesium battery electrolytic solution having a wide and stable electrochemical window and excellent reversible deposition characteristics of magnesium.

BACKGROUND OF THE INVENTION

At present, examples of practical secondary battery systems mainly include a lead-acid battery, a nickel-hydrogen battery, and a lithium ion battery. These batteries play important roles in our daily life and socioeconomic development. The use of a lead-acid battery is, however, limited due to the low energy density thereof and the serious pollution to the environment. In the past few years, a nickel-hydrogen battery has been a mainstream battery in hybrid systems due to the mature technology and high safety. A nickel-hydrogen battery has, however, an insufficient energy density, with a small room for further improvement in performance because of a limit being reached at which its technological development is no longer possible. Since a secondary lithium battery has advantages such as a high energy density, a long cycle life, and environmental friendliness, the research and development thereof is receiving attention. The use of metal lithium is currently limited only to an intercalation negative electrode material such as graphite, due to high activity with a low melting point and the occurrence of phenomenon of deposition of dendritic lithium crystals in many of organic electrolytic solutions. In addition, a lithium secondary battery has unsolved reliability and safety concern. The electrochemical research is therefore directed to the development of a new-type battery having a high specific energy and high safety, causing no pollution.

Metal magnesium as a negative electrode has a theoretical specific capacity of 2205 mAh/g, and an electrode potential of approximately −2.37 V vs. SHE, with excellent conductivity and mechanical properties. Magnesium in particular has advantages such as a low cost (approximately 1/24 of the cost of lithium), high safety, and environmental friendliness. A magnesium battery is thus excellent in safety and cost. Researches on magnesium as electrode material thus draw attention of scientific researchers (The Journal of The Electrochemical Society, 1990, 137 (3): 775-780). According to the research results of magnesium secondary battery by researchers such as Aurbach, it is believed that although a magnesium secondary battery cannot be competitive with a lithium ion battery in the field of small-sized appliances (e.g. portable electric appliances), it has potential advantages for use in large-sized appliances, being applicable as a green rechargeable battery for use in an electric vehicle or an energy accumulation device (Nature, 2000, 407 (6805): 724-727).

A main factor for limiting the development of a magnesium secondary battery is the difference in characteristics between an inactivated membrane formed on the surface of metal lithium and an inactivated film formed on the surface of magnesium in many aprotic electrolytic solutions. The inactivated membrane formed on the surface of lithium is a good conductor of lithium ions, while the inactivated membrane formed on the surface of magnesium is a poor conductor of magnesium ions. Since magnesium ions thus cannot pass through the inactivated membrane, the electrochemical activity thereof is restricted. It can be said that the development of a magnesium secondary battery is greatly related to the development of an electrolytic solution.

According to the past research results, the reversible deposition of magnesium has not been achieved in an aprotic polar solvent of a simple ionized magnesium salt (e.g. $MgCl_2$, $Mg(ClO_4)_2$, and $Mg(CF_3SO_3)_2$) (Journal of Electroanalytical Chemistry, 1999, 466 (2): 203-217). The reversible deposition and elution of Mg can be achieved in an ether solution of a Grignard reagent. A common Grignard reagent, however, has a narrow electrochemical window and high activity, so that it cannot be directly used as a magnesium secondary battery electrolytic solution. In 1990, Gregory et al. disclosed that an ether solution of $Mg[B(Bu_2Ph_2)]_2$ also allowed for the reversible deposition of Mg, wherein Eu represents butyl and Ph represents phenyl (U.S. Pat. No. 4,894,302). It has an electrochemical window at approximately 1.9 V (vs. $Mg/Mg^{2+}$), which is much higher than that of a common Grignard reagent by several hundred mV. A magnesium secondary battery Mg∥ 0.25 mol/L $Mg[B(Bu_2Ph_2)]_2$/70% THF+30% DME∥ $Co_2O_4$ was assembled for the first time, using the electrolytic solution. The battery system had a utilization factor of the positive electrode active material of 86% and a coulombic efficiency of charging/discharging of 99%. Although the battery had a low discharging voltage and dreadful polarization, it demonstrated that a magnesium secondary battery was technically viable.

Problems to be Solved by the Invention

At present, the most mature example of magnesium secondary battery electrolytic solution systems is formed of 0.25 mol/L $Mg(AlCl_2EtBu_2)$/tetrahydrofuran, wherein Et represents ethyl and Bu represents butyl, which was proposed in 2000 by Aurbach who is a scientist in Israel. The electrolytic solution having a stable electrochemical window at 2.2 V vs. $Mg/Mg^{2+}$ or higher allowed a big step toward practical application of magnesium secondary batteries to be taken (Nature, 2000, 407: 724-727). The electrolytic solution, however, has a relatively narrow electrochemical window, so that the use of a positive electrode material having a high redox potential and capacity is restricted. The electrolyte system is thus the most important bottleneck in the development of magnesium secondary batteries.

In recent years, polymer solid electrolytes of a magnesium battery have attracted attention, and various types of polymer systems have been presented (Solid State Ionics, 2000, 128 (1-4): 203-210; and Journal of Power Sources, 2001, 102 (1-2): 46-54). An additive such as $SiO_2$ nano particles, magnesium salt nano particles, or an ionic liquid has been added to the polymer systems. The research content, however, basically has included the measurements of conductivity and cycle voltage-current curve only, not relating to the reversibility in electrode processes such as magnesium deposition/elution, lacking the direct evidence of metal magnesium deposition. As a result, no polymer solid electrolyte system for use in a secondary magnesium battery has been disclosed. In order to develop a polymer electrolyte of a magnesium battery, it is necessary to understand the ionic dissociation and conductivity mechanism in an electrolyte for the research of electrical deposition process of metal magnesium. On the other hand, an ionic liquid has advantages such as hardly causing volatilization and thermal decomposition and having high thermal stability and a wide electrochemical window, to satisfy the conditions required for the solvent of a magnesium secondary battery. Accordingly, researches on an ionic liquid have increased in recent several years. Since the interface characteristics of an ionic liquid electrolytic solution are complicated and dominantly affected by the purity of an electrolytic solution, the efficiency of reversible deposition and the cycle stability of magnesium are not ideal yet at present. For the development of a high-performance magnesium secondary battery, the development of an electrolytic solution system having a higher conductivity and anode oxidation potential, a high efficiency of reversible deposition/elution of magnesium, and excellent cycle performance is in the main direction of development of the current magnesium secondary battery.

The present invention has been made to solve the above technological problems. An object of the present invention is to provide a new-type magnesium secondary battery electrolytic solution having a wide and stable electrochemical window and excellent reversible deposition characteristics of magnesium.

Means for Solving the Problems

The present invention relates to a magnesium battery electrolytic solution and a method of manufacturing the same. The electrolytic solution includes a solute of a synthesized new-type organic boron magnesium salt complex that is blended with an aprotic polar solvent such as an organic ether to have a concentration of 0.2 to 1 mol/L. The electrolytic solution has a wide electrochemical window, high electrochemical stability, high conductivity, and excellent reversible deposition characteristics of magnesium. The important problems for developing a magnesium battery having a high voltage and a high capacity are thus solved.

The organic boron magnesium salt of the magnesium battery electrolytic solution of the present invention is an organic boron magnesium salt complex synthesized from a Lewis acid $R_3B$ with a boron center and a magnesium-containing Lewis base $R'_{2-n}MgX_n$, wherein n represents 0 or 1, R and R' each represent a fluoroaryl group, an alkylated aryl group, an aryl group, an alkyl group, or a pyrrolidinyl group, and X represents halogen. R and R' may be the same or different.

In the present invention, the Lewis acid with a boron center is manufactured by the following method.

An organic halide, metal magnesium, and a boron halide are reacted in dried anhydrous ethyl ether under an inert gas atmosphere. After initiation of the reaction, the reaction liquid is slowly dripped for the reaction to continue while keeping microboiling. After the reaction, filtration is performed under an inert gas atmosphere. The produced filtrate is vacuum extracted to remove the ethyl ether solvent. A Lewis acid with a boron center is thus produced.

All the operations including the preparation of an electrolytic solution and the assembling of a battery are performed in a glove box under an argon atmosphere.

The prepared 0.2 to 1 mol/L electrolytic solution is placed in a conductivity measuring cell inLab 710 (Mettler-Toledo, Switzerland) for the measurement of conductivity with a conductivity meter FE30.

A three-electrode system of a pipe-type three-electrode measuring glass cell is assembled from a working electrode of platinum, 2 to 5 ml of the 0.2 to 1 mol/L electrolytic solution enclosed, and a counter electrode and a reference electrode of metal magnesium. A cyclic voltammetry is performed at a scanning rate of 1 to 300 mV/s in a glove box under an argon atmosphere.

A button type battery is assembled from a positive electrode of a Ag piece, 0.1 to 0.5 mL of the 0.2 to 1 mol/L, electrolytic solution enclosed, a negative electrode of metal magnesium, and a barrier membrane of porous polyethylene. At a charging/discharging current density of 0.1 to 5 $mA/cm^2$, the constant current discharging (magnesium deposition) is controlled by time and the constant current charging (magnesium elution) is controlled by voltage, to conduct a performance test of the deposition/elution of magnesium.

A button type battery is assembled from a positive electrode of a Ag piece, 0.1 to 0.5 mL of the 0.2 to 1 mol/L electrolytic solution enclosed, a negative electrode of metal magnesium, and a barrier membrane of porous polyethylene. An electrochemical deposition is performed under conditions of a deposition current density of 0.1 to 10 $mA/cm^2$ and a deposition time of 5 to 24 hours. The battery is then disassembled in a glove box under an argon atmosphere and cleaned with tetrahydrofuran. The deposit is measured by X-ray diffraction (XRD) and with a scanning electron microscope (SEM).

DETAILED DESCRIPTION OF THE INVENTION

Although the present invention is described in more detail based on Examples in the following, the present invention is not limited to the following Examples.

Example 1

Into a 100 mL round-bottomed flask, 0.528 g of Mg, 2.05 g of boron trifluoride ethyl ether, and a small amount of $I_2$ were placed and a small amount of an ethyl ether solution of m-methyl-bromobenzene was dripped into the flask. After initiation of the reaction, the ethyl ether solution of m-methyl-bromobenzene was slowly dripped. After completion of the dripping, the mixture was continuously agitated for 3 to 5 hours. The produced reaction liquid was then filtrated under a nitrogen atmosphere. The filtrate was vacuum extracted to remove ethyl ether, so that a waxy solid of tri(meta-tolyl)boron was obtained. The solid and PhMgCl were compounded in a glove box under an argon atmosphere, so that a tetrahydrofuran solution of 0.4 M $R_3B$—$(PhMgCl)_2$, wherein R represents meta-tolyl, was obtained as a new-type magnesium secondary battery electrolytic solution. 4 ml of the electrolytic solution was placed in a conductivity measuring cell inLab 710 (Mettler-Toledo, Switzerland) to measure the conductivity with a conductivity meter FE30. As a result, the electrolytic solution had a conductivity of 1.2 mS/cm.

Figure 1:
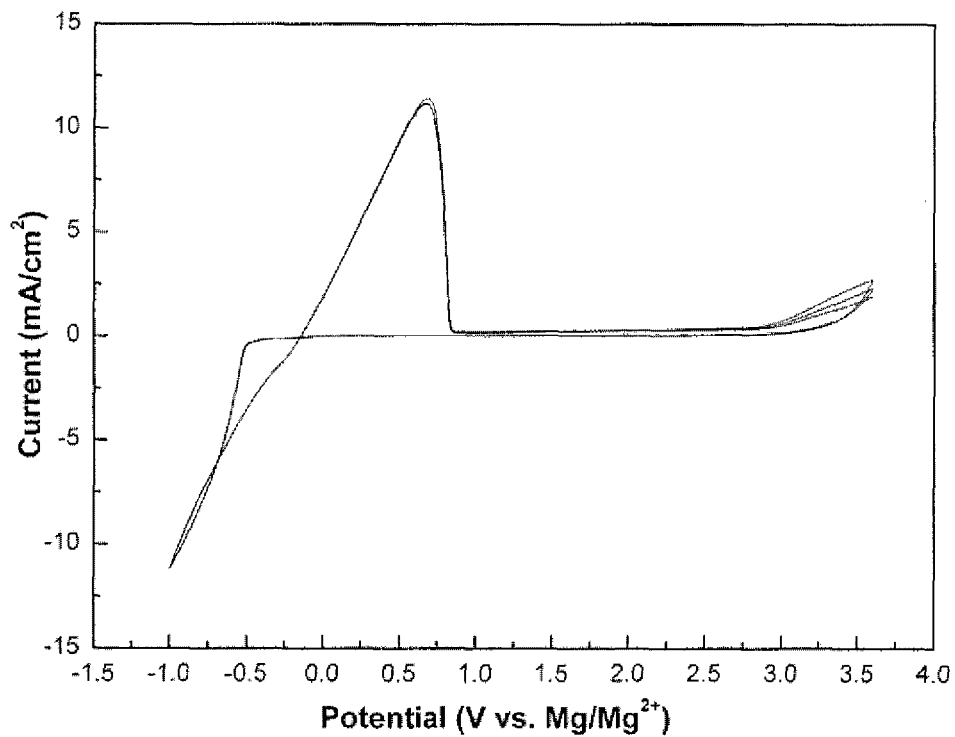
FIG. 1 is a chart illustrating the cycle voltage-current curve at the working electrode of Pt plate of 0.4 M magnesium secondary battery electrolytic solution prepared in Example 1.

A three-electrode system was assembled from a working electrode of platinum, 3 mL, of the electrolytic solution enclosed, and a counter electrode and a reference electrode of metal magnesium. A cycle voltage-current test was performed at a scanning rate of 50 mV/s in a glove box under an argon atmosphere. The cyclic voltammetry results in FIG. 1 show that the redox process occurring near 0 V vs. $Mg/Mg^{2+}$ corresponded to the deposition/elution of magnesium, having an anode oxidation potential of 3.0 V vs. $Mg/Mg^{2+}$ or higher.

Example 2

Into a 100 mL round-bottomed flask, 0.528 g of Mg, 2.05 g of boron trifluoride ethyl ether, and a small amount of $I_2$ were placed and a small amount of an ethyl ether solution of m-methyl-bromobenzene was dripped into the flask. After initiation of the reaction, the ethyl ether solution of 1-bromo-3,5-dimethylbenzene was slowly dripped. After completion of the dripping, the mixture was continuously agitated for 10 hours. The produced reaction liquid was then filtrated under a nitrogen atmosphere. The filtrate was vacuum extracted to remove the ethyl ether solvent, so that a pink color solid of tri(meta-dimethylphenyl)boron was obtained. The solid and PhMgCl were compounded in a glove box under an argon atmosphere, so that a tetrahydrofuran solution of 0.25 M $R_3B$—$(PhMgCl)_2$, wherein R represents meta-dimethylphenyl, was obtained as a new-type magnesium secondary battery electrolytic solution. 4 ml of the electrolytic solution was placed in a conductivity measuring cell inLab 710 (Mettler-Toledo, Switzerland) to measure the conductivity with a conductivity meter FE30. As a result, the electrolytic solution had a conductivity of 1.3 mS/cm.

Figure 2:
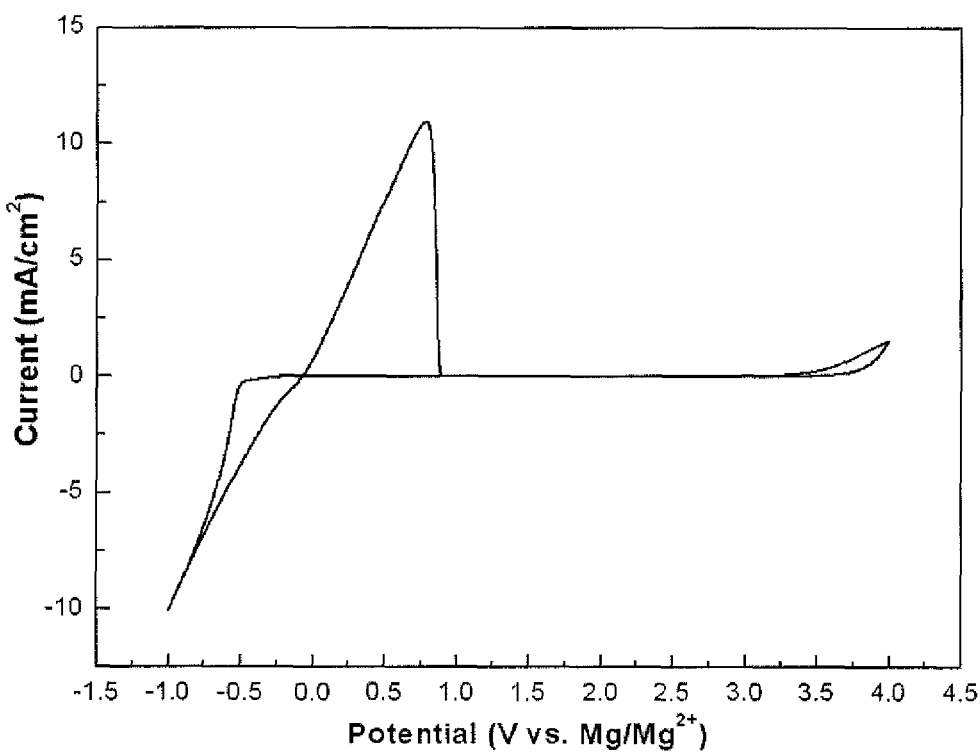
FIG. 2 is a chart illustrating the cycle voltage-current curve at the working electrode of Pt plate of 0.25 M magnesium secondary battery electrolytic solution prepared in Example 2.

A three-electrode system was assembled from a working electrode of platinum, 3 mL of the electrolytic solution of 3 mol/L enclosed, and a counter electrode and a reference electrode of metal magnesium. A cycle voltage-current test was performed at a scanning rate of 50 mV/s in a glove box under an argon atmosphere. The cycle voltage-current test results in FIG. 2 show that the redox process occurring near 0 V vs. $Mg/Mg^{2+}$ corresponds to the deposition/elution of magnesium. Since the electrolytic solution system had a broadened electrochemical window due to the methyl substituted organic boron magnesium salt, no oxidation was caused at a stable anode potential of 3.5 V vs. $Mg/Mg^{2+}$, which is much higher than that (2.5 V vs. $Mg/Mg^{2+}$) of 0.25 mol/L $Mg(AlCl_2EtBu_2)$/tetrahydrofuran system, i.e. the most excellent magnesium secondary battery electrolytic solution at present.

Figure 3:
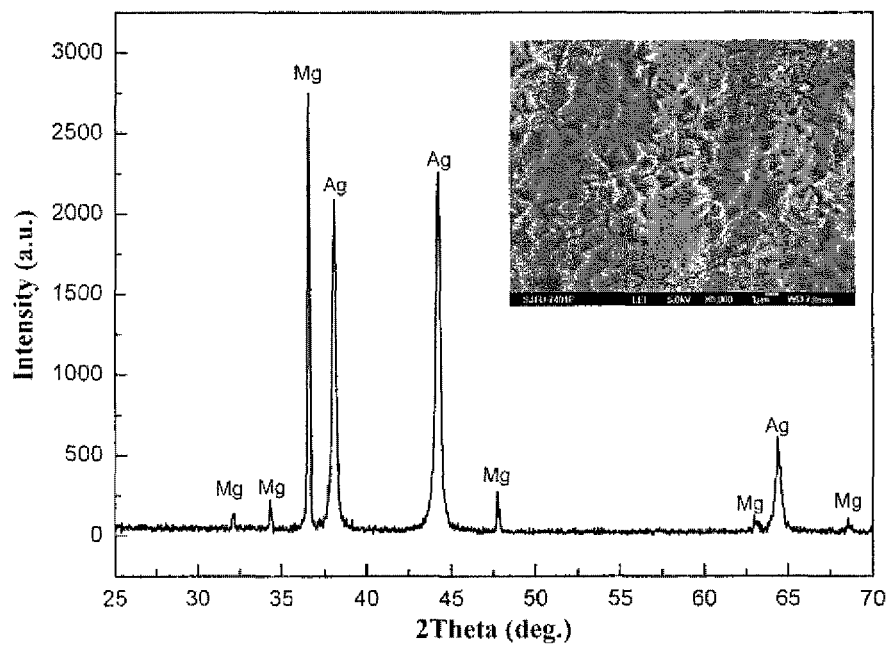
FIG. 3 is a chart illustrating the X-ray diffraction spectrum and a scanning electron micrograph of the deposited magnesium obtained in Example 2.
Figure 4:
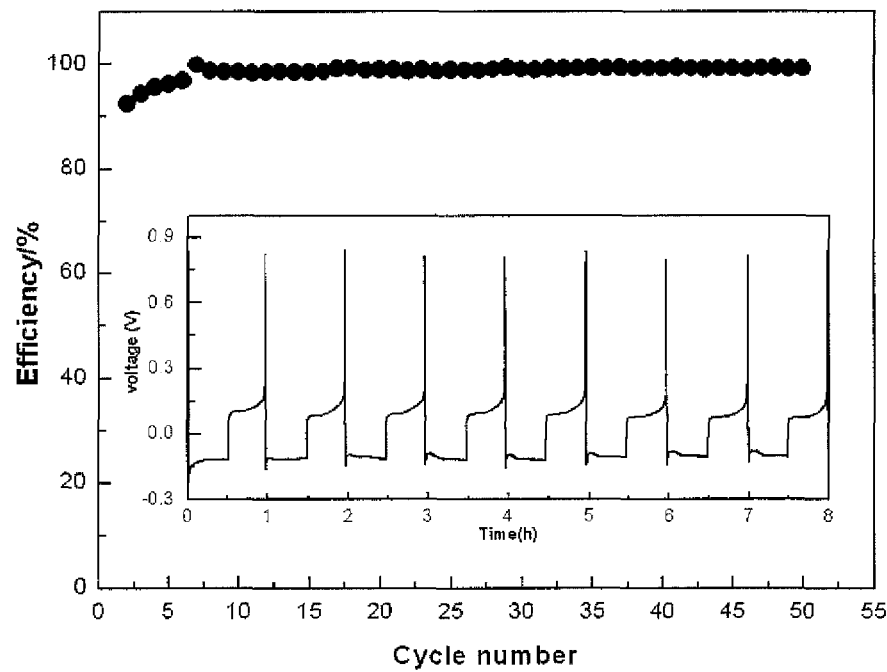
FIG. 4 is a chart illustrating the deposition/elution efficiency and the charge/discharge curve of magnesium in Example 2.

A button type battery was assembled from a positive electrode of a Ag piece, 0.3 mL of the electrolytic solution enclosed, a negative electrode of metal magnesium, and a barrier membrane of polyethylene. An electrochemical deposition was performed under conditions at a deposition current density of 0.1 mA/cm² and a deposition time of 8 hours. The battery was then disassembled in a glove box under an argon atmosphere and cleaned with tetrahydrofuran. The deposit was measured by X-ray diffraction (XRD) and with a scanning electron microscope (SEM). The XRD results in FIG. 3 show that diffraction peaks emerging at 32.0, 34.3, 36.4, and 47.7 were peaks of metal magnesium (JCPDS 35-0821). The SEM results (refer to FIG. 3) show that the deposited magnesium layer was dense and flat.

Figure 5:
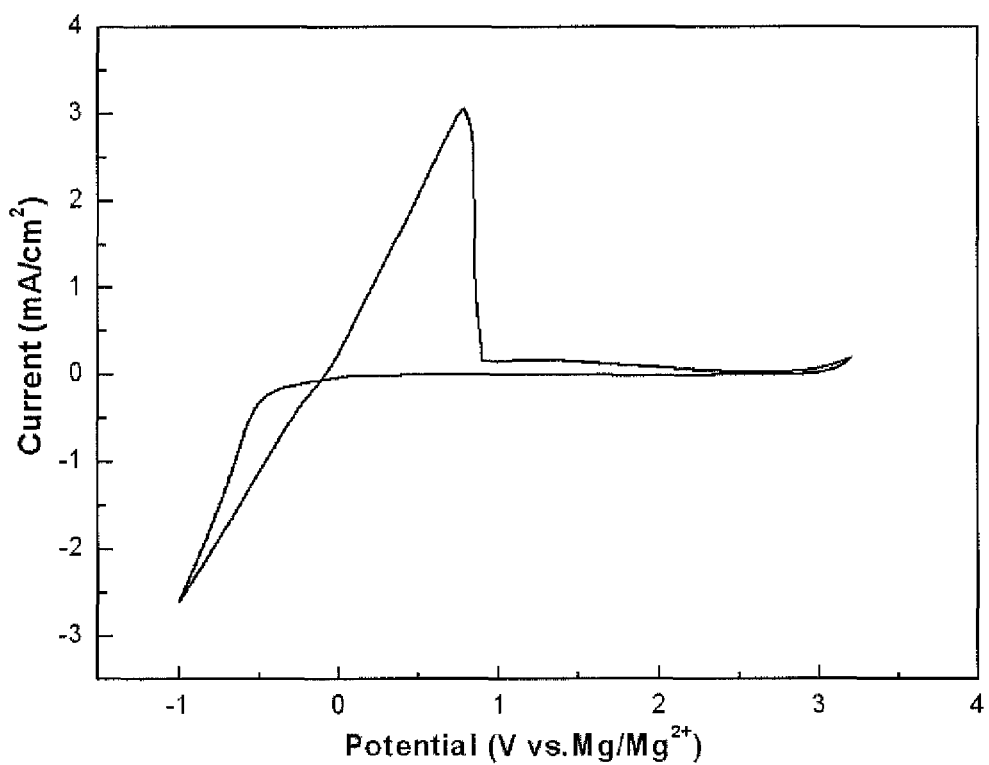
FIG. 5 is a chart illustrating the stabilized cycle voltage-current curve at the working electrode of Pt plate of 0.25 M magnesium secondary battery electrolytic solution prepared in Example 4.

A button type battery was assembled from a positive electrode of a Ag piece, 0.1 to 0.5 mL of the 0.25 mol/L electrolytic solution enclosed, a negative electrode of metal magnesium, and a barrier membrane of porous polyethylene. Under the conditions of a charging/discharging current density of 0.1 mA/cm², a constant current discharging time of 30 min, and a constant current charging off voltage of 0.8 V, the performance of deposition/elution of magnesium was measured. The deposition/elution efficiency and the charge/discharge curve of magnesium in FIG. 5 show that the electrolytic solution had excellent reversible deposition characteristics of magnesium and a stable cycle efficiency of 99% or higher.

Example 3

Into a 100 mL round-bottomed flask, 0.528 g of Mg, 2.05 g of boron trifluoride ethyl ether, and a small amount of $I_2$ were placed and a small amount of an ethyl ether solution of m-methyl-bromobenzene was dripped into the flask. After initiation of the reaction, the ethyl ether solution of m-fluoro-bromobenzene was slowly dripped. After completion of the dripping, the mixture was continuously agitated for 2 hours. The produced reaction liquid was then filtrated under a nitrogen atmosphere. The filtrate was vacuum extracted to remove the ether solvent, so that a yellow color solid of tri(meta-fluorophenyl)boron was obtained. The solid and PhMgCl were compounded in a glove box under an argon atmosphere, so that a tetrahydrofuran solution of 0.25 M $R_3B$—$(PhMgCl)_2$, wherein R represents meta-fluorophenyl, was obtained as a new-type magnesium secondary battery electrolytic solution. 4 ml of the electrolytic solution was placed in a conductivity measuring cell inLab 710 (Mettler-Toledo, Switzerland) to measure the conductivity with a conductivity meter FE30. As a result, the electrolytic solution had a conductivity of 1.08 mS/cm.

A three-electrode system was assembled from a working electrode of platinum, 3 mL of the 1 mol/L electrolytic solution enclosed, and a counter electrode and a reference electrode of metal magnesium. A cyclic voltammetry was performed at a scanning rate of 50 mV/s in a glove box under argon atmosphere. The cycle voltage-current test results showed that the redox process occurring near 0 V vs. $Mg/Mg^{2+}$ corresponds to the deposition/elution of magnesium, having an anode oxidation potential of 3.0 V vs. $Mg/Mg^{2+}$ or higher.

Example 4

The triaryl boron $R_3B$, wherein R represents 3,5-dimetalphenyl, prepared in Example 2, and PhMgCl were compounded, so that a mixed ether solution (tetraethylene glycol dimethyl ether:tetrahydrofuran=3:1) of 0.25 M $R_3B$—$(PhMgCl)_2$ was obtained as a new-type magnesium secondary battery electrolytic solution. The electrolytic solution allowed the volatility of tetrahydrofuran as solvent to be significantly reduced, so that safety was significantly improved. 4 ml of the electrolytic solution was placed in a conductivity measuring cell inLab 710 (Mettler-Toledo, Switzerland) to measure the conductivity with a conductivity meter FE30. As a result, the electrolytic solution had a conductivity of 0.91 mS/cm.

A three-electrode system was assembled from a working electrode of platinum, 3 mL of the 1 mol/L electrolytic solution enclosed, and a counter electrode and a reference electrode of metal magnesium. A cyclic voltammetry was performed at a scanning rate of 50 mV/s in a glove box under argon atmosphere. The cycle voltage-current test results show that the redox process occurring near 0 V vs. Mg/Mg$^{2+}$ corresponds to the deposition/elution of magnesium, having an anode oxidation potential of 3.0 V vs. Mg/Mg$^{2+}$ or higher (refer, to FIG. 5).

The invention claimed is:

1. A magnesium battery electrolytic solution comprising a solute of an organic boron magnesium salt blended with an aprotic polar solvent, wherein:
    the concentration of the organic boron magnesium salt is 0.2 to 1 mol/L;
    the aprotic polar solvent is an ether; and
    the organic boron magnesium salt is an organic boron magnesium salt complex having a structure of R$_3$B—(R'MgX)$_2$, where R and R' are the same or different and each represent a fluoroaryl group, an alkylated aryl group, an aryl group, an alkyl group, or a pyrrolidinyl group, and X represents a halogen, and wherein R$_3$B is a Lewis acid with a boron center that is at least one selected from the group consisting of compounds represented by the following structural formulae:

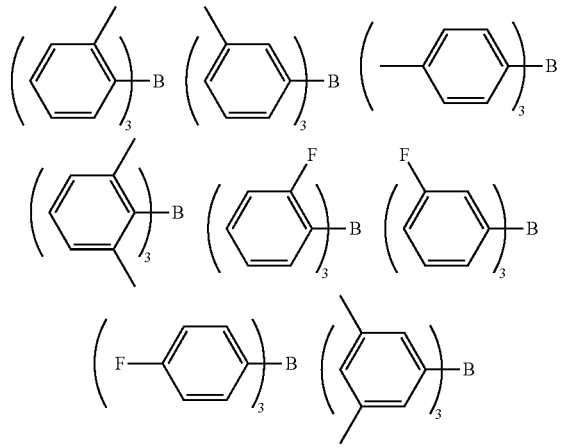

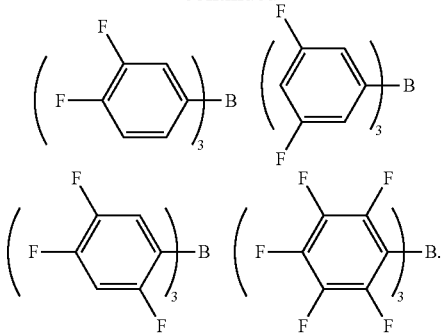

2. The magnesium battery electrolytic solution according to claim 1, wherein the Lewis acid with a boron center is obtained by reacting an organic halide, metal magnesium, and a boron halide in dried anhydrous ethyl ether under an inert gas atmosphere, dripping a reaction liquid slowly after initiation of the reaction to allow the reaction to continue for 2 to 24 hours while keeping microboiling, performing filtration under an inert gas atmosphere after the reaction, and removing an ethyl ether solvent from the obtained filtrate by vacuum extraction.

3. The magnesium battery electrolytic solution according to claim 1, wherein the organic boron magnesium salt complex has a synthesis ratio of a Lewis acid to a Lewis base of 1:1 to 1:3.

4. The magnesium battery electrolytic solution according to claim 1, wherein:
    the aprotic polar solvent dissolves the organic boron magnesium salt and coordinates with the organic boron magnesium salt, and
    the aprotic polar solvent is selected from the group consisting of tetrahydrofuran, 2-methyltetrahydrofuran, ethyl ether, butyl ether, 1,3-dioxane, 1,2-dimethoxyethane, dimethyl ether, ethylene glycol dimethyl ether, diethylene glycol dimethyl ether, tetraethylene glycol dimethyl ether, and combinations thereof.

* * * * *

UNITED STATES PATENT AND TRADEMARK OFFICE
CERTIFICATE OF CORRECTION

PATENT NO. : 10,559,851 B2
APPLICATION NO. : 14/232732
DATED : February 11, 2020
INVENTOR(S) : Jun Yang et al.

Page 1 of 1

It is certified that error appears in the above-identified patent and that said Letters Patent is hereby corrected as shown below:

On the Title Page

Item (56) "References Cited" section, please insert:

"U.S. Patent Documents" section:
--4,894,302, 1/16/1990, Hoffman et al.
2011/0111286 A1, 5/12/2011, Yamamoto et al.--

"Foreign Patent Documents" section:
--CN 101924213 A 12/22/2010
CN 102047491 A 5/4/2011--

"Other Publications" section:
--GREGORY et al., "Nonaqueous Electrochemistry of Magnesium," *J. Electrochem. Soc.*, March 1990, Vol. 137, No. 3, pp. 775-780.
AURBACH, et al., "Prototype Systems for Rechargeable Magnesium Batteries," *Letters to Nature*, October 12, 2000, Vol. 407, pp. 724-727.
LU et al., "On the Electrochemical Behavior of Magnesium Electrodes in Polar Aprotic Electrolyte Solutions," *Journal of Electroanalytical Chemistry*, 1999, Vol. 466, pp. 203-217.
KUMAR et al., "A Gel Polymer Electrolyte of Magnesium Triflate," *Solid State Ionics*, 2000, pp. 203-205.
KUMAR et al., "Solid-State Rechargeable Magnesium Cell with Poly(Vinylidenefluoride)-Magnesium Triflate Gel Polymer Electrolyte," *Journal of Power Sources*, 2001, Vol. 102, pp. 46-54.--

Signed and Sealed this
Sixteenth Day of June, 2020

Andrei Iancu
*Director of the United States Patent and Trademark Office*